United States Patent Office 3,299,081
Patented Jan. 17, 1967

3,299,081
CHEMICAL PROCESSES FOR PREPARING
N-SUBSTITUTED AMIDINES
Meyer Sletzinger, North Plainfield, Walter A. Gaines, Rahway, and Victor J. Grenda, Edison, N.J., assignors to Merck & Co., Inc., Rahway, N.J., a corporation of New Jersey
No Drawing. Filed Sept. 13, 1963, Ser. No. 308,638
9 Claims. (Cl. 260—302)

This invention relates to an improved method for making N-aryl and N-heteroaryl amidines. More particularly, it relates to a new improved process for making N-aryl and N-heteroaryl amidines from a primary aromatic amine and a nitrile. It relates more specifically to an improved process by which N-phenyl and N-pyridyl amidines may be obtained in very high yield and in a high degree of purity from an aromatic amine hydrochloride and a nitrile.

Prior to the present invention, it was known that N-aryl amidines could be prepared by reacting together a nitrile and an aromatic amine in the presence of a metal catalyst such as aluminum chloride or zinc chloride. It was also known to prepare such compounds by reacting the nitrile and the aromatic amine hydrochloride in a solvent such as ether in the absence of metallic halide. However, neither of these methods are entirely satisfactory. The first-mentioned process entails the use of a metallic halide as an additional substance in the reaction mixture with the result that metal complexes are obtained which have to be decomposed and the metal removed before pure amidine compounds can be recovered. The second process referred to affords only poor yields of the desired amidine. It is an object of our invention to provide a synthesis of N-aryl and N-heteroaryl amidines which is free of the disadvantages of prior methods, and which affords the desired products in high yield and in a highly pure state.

In accordance with the present invention, we have now discovered that N-aryl and N-heteroaryl amidines may be readily prepared in high yield from the appropriate aromatic amine hydrochloride and nitrile by carrying out the reaction in a polychlorobenzene solvent medium, preferably in the presence of excess hydrogen chloride.

The chemical process may be represented as follows:

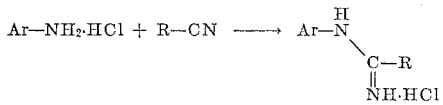

where Ar represents an aromatic ring, and more particularly an aryl radical such as phenyl, naphthyl, and substituted phenyl or naphthyl, or a heteroaryl radical examples of which are the pyridyl and quinolinyl radicals; R above represents aryl or heteroaryl, as is discussed more fully hereinbelow. Although the aromatic amine is conveniently charged to the reaction mixture as the free base, at least sufficient hydrogen chloride is added to convert all of such amine to the hydrochloride salt, and for this reason the amine reactant, as shown in the flow diagram, is actually the acid salt. The resulting amidine will also exist as the hydrochloride, although the amidine free base can, if desired, be obtained by neutralization of the acid addition salt with a base such as an alkali metal hydroxide.

The process is carried out by heating the aromatic amine hydrochloride and the nitrile in a polychlorobenzene medium. It is important that the reaction be carried out under anhydrous conditions. The aromatic amine and the nitrile react on an equimolar basis, and good results are obtained in our process when equimolar amounts of the reactants are employed. This is not essential, however, and a molar excess of either the amine or the nitrile can be used satisfactorily. We prefer to employ about a 1–10% molar excess of nitrile since this minimizes any contamination of the resulting amidine with the amine reactant.

According to the process improvement of the invention, we have found that the yield of desired amidine is significantly improved by carrying out the process in a polychlorobenzene solvent medium. A still further improvement is achieved by employing an excess of hydrogen chloride in conjunction with the polychlorobenzene solvent.

The reaction is brought about at elevated temperatures of about 100–165° C. For this reason the polychlorobenzene used as the reaction medium should be a liquid at these temperatures. We prefer to employ a dichloro- or a trichlorobenzene, or mixtures thereof, as the solvent. In many cases, the commercially available polychlorobenzenes are mixtures of isomers, and such mixtures are satisfactory for our process. All of this group of solvents are liquid well below the reaction temperature. (1,3,5-trichlorobenzene, M.P. 63° C., is the highest melting.) A further advantage is that all have a boiling point above the preferred operating temperature (m-dichlorobenzene of B.P. 172° C. is the lowest boiling), although this is not essential since the reaction could be carried out at the reflux temperature of the solvent, or even under pressure above the boiling point. Of the six dichloro- and trichlorobenzenes, i.e. o-, m- and p-dichlorobenzene, and 1,2,3-, 1,2,4- and 1,3,5-trichlorobenzene, we greatly prefer to use o-dichlorobenzene as the reaction medium, since excellent yields of amidine hydrochloride are thereby obtained.

Normally, the nitrile and the aromatic amine are mixed in the o-dichlorobenzene reaction medium and hydrogen chloride added to the resulting mixture in sufficient quantity to convert all of the amine base to the hydrochloride. High yields of amidine are obtained using only sufficient acid to convert all the amine to its hydrochloride. However, we have found that even higher yields are achieved by using an excess of hydrogen chloride over that required for formation of the aromatic amine hydrochloride. Thus, the use of excess hydrogen chloride in a polychlorobenzene medium constitutes a preferred embodiment of the invention. For best results, at least a 5% excess of hydrogen chloride is used, and we prefer to employ a 10–50% excess. In speaking of excess acid, we mean molar excess with respect to the amount of primary amine charged to the reaction. The excess acid forms a salt with the less basic nitrile reactant.

The additon of the excess hydrogen chloride is conveniently carried out by passing a stream of gas into the reaction mass over most or all of the total reaction period. Alternatively, the total amount of acid may be charged and a slight positive hydrogen chloride pressure (1–5 p.s.i.g.) maintained during the reaction. In this latter case, a closed reactor is used. This is more convenient in large equipment than it is in small-scale experiments.

As a matter of convenience, it is preferred to charge the amine as the free base, and form the hydrochloride salt directly in the o-dichlorobenzene reaction medium. Good results are obtained by adding sufficient acid to accomplish this, warming the mixture of nitrile and amine hydrochloride in o-dichlorobenzene to the reaction temperature, and adding the excess acid over the reaction period. However, all or part of the excess hydrogen chloride can be added at the start if desired. It will be clear from the foregoing explanation of our invention that reference to the excess hydrogen chloride is intended to mean the total hydrogen chloride employed in carrying out the process, and that all of this excess need not be present at the beginning of the reaction.

As previously stated, a feature of our improved process is conducting the reaction in a polychlorobenzene, and most desirably in o-dichlorobenzene. There is no criticality in the amount of solvent used as long as there is sufficient to keep the reaction mixture fluid. The N-aryl amidine hydrochlorides are essentially insoluble in the medium and crystallize or precipitate as the reaction proceeds.

Our invention resides in use of the polychlorobenzene solvent, with an equimolar and preferably with an excess quantity of hydrogen chloride, rather than in the time and temperature conditions used. However, we have found that formation of the amidine hydrochloride occurs very satisfactorily at temperatures in the range of from about 100–165° C. and preferably from about 115–150° C. Under the preferred temperature conditions the formation of N-aryl or N-heteroaryl amidine is substantially complete in from 1–4 hours, and best results are obtained by carrying out the process for from 1½ to 3 hours. Since the amidine hydrochloride is insoluble in the reaction medium, it may be readily recovered in a high state of purity by cooling and filtering of the reaction mixture. Alternatively, the amidine hydrochloride may be extracted into water, in which it is highly soluble, and the aqueous solution containing the desired product separated by known techniques from the water-immiscible o-dichlorobenzene or other di- or tri-chlorobenzene.

In this manner, amidines of the formula

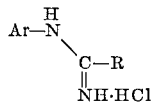

where Ar and R are as previously defined, may be obtained from the appropriate aromatic amines and nitriles in very high yield; yields of above 90% of theoretical are normally obtained under the preferred conditions. The amount of readily recoverable amidine is close to quantitative under such preferred conditions, i.e. o-dichlorobenzene solvent and excess hydrogen chloride, when the o-dichlorobenzene is recycled for subsequent experiments since loss of recoverable product by virtue of some slight solubility in the solvent is thereby eliminated.

The process improvements of this invention are applicable to the synthesis of amidine hydrochlorides embraced by structural Formula I above. In all cases where such amidines may be obtained by reaction of an aromatic amine with an aryl or heteroaryl nitrile, the yields are significantly improved by employing a di- or tri-chlorobenzene solvent and at least sufficient hydrogen chloride to convert the amine to its hydrochloride.

A preferred embodiment of the invention is application of these process improvements to making amidines of the formula

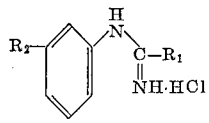

where $R_1$ repersents phenyl, substituted phenyl and particularly halophenyl, pyridyl, naphthyl, or cyclic five-membered heteroaromatic radicals having at least two carbon atoms in the hetero ring and having as the hetero atoms nitrogen, sulfur and/or oxygen. Representative examples of such heterocyclic radicals are furyl, pyrryl, thienyl, thiazolyl, isothiazolyl, thiadiazolyl, oxazolyl, imidazolyl and the like. $R_2$ may be a hydrocarbonyl radical such as lower alkyl, e.g. methyl, ethyl, or an aryl radical such as phenyl, it may also represent lower alkoxy such as methoxy or ethoxy, or phenoxy, methylthio or phenylthio. Such amidines are, as will be appreciated, obtained by reacting aniline hydrochloride or a 3-substituted aniline hydrochloride with the appropriate nitrile. If it is desired to prepare an N-pyridyl amidine, an amino pyridine will be used in place of aniline. Such reactants are known in the art or readily obtained by methods known in the art.

The following examples are given for the purpose of illustration and not by way of limitation.

Example 1

A solution of 41.8 g. (0.45 m.) of aniline and 50 g. (0.45 m.) of 4-cyanothiazole in 200 ml. of o-dichlorobenzene is heated to 140° C. 20 g. (0.55 m.) of hydrogen chloride is then added over a period of 2½ hours, with agitation. During the first ½ hour aniline hydrochloride separates as a solid but soon liquifies. At the end of the reaction period the mixture is cooled to 25° C. and the crystals of N-phenyl-(thiazole-4-amidine) hydrochloride collected by filtration. 105 g. are obtained (96% yield), M.P. 256–259° C.

When 0.45 m. of hydrogen chloride is used, the yield of N-phenyl-(thiazole-4-amidine) is 80% of theoretical.

Example 2

41.8 g. (0.45 m.) of aniline is dissolved in 150 ml. of o-dichlorobenzene, and the solution is heated to 110° C. Sufficient hydrogen chloride is then added to convert all of the aniline to its hydrochloride. The temperature rises to 135–140° C. 50 g. (0.45 m.) of 2-cyanothiazole in 50 ml. of o-dichlorobenzene is added to the aniline hydrochloride solution over a period of 30 minutes. During this time an additional 4.0 g. of hydrogen chloride is added to the reaction mixture. The mixture is then heated at 140° C. for 2½ hours. At the end of this time the N-phenyl-(thiazole-2-amidine) is recovered as in Example 1, in greater than 90% yield.

Similar results are obtained by employing 1,3,5-trichlorobenzene in place of o-dichlorobenzene.

Example 3

When the procedure of Example 1 is repeated using 42 g. of furan-2-nitrile instead of 4-cyanothiazole there is obtained N-phenyl-(furan-2-amidine)-hydrochloride.

Example 4

1.25 moles of aniline and 1.25 moles of 4-cyanothiazole are added to 550 ml. of o-dichlorobenzene in a 1 liter vessel fitted with a thermometer and gas inlet tube extending below the liquid surface. The reactants are stirred and heated to 105° C., at which time addition of dry hydrogen chloride is begun. A total of 1.5 moles of gas is added during which time the temperature rises to 135–140° C. When addition of gas is complete, the reaction mass is heated, with stirring, at 140°–145° C. for 2.5 hours.

The mixture is then cooled to 100° C. and added to 1200 ml. of water. The pH of the aqueous phase is maintained at 4.5 with concentrated sodium hydroxide.

After thorough mixing the mixture is allowed to separate into an aqueous phase and an o-dichlorobenzene phase. The phases are separated. The aqueous phase contains over 270 gm. of N-phenyl-(thiazole-4-amidine) hydrochloride, by potentiometric assay with 0.1 N sodium hydroxide, end point pK ½ =7.5.

Example 5

Dry hydrogen chloride gas is added at a rate of 7.2 meq./minute to a stirred solution of 20.6 g. (0.187 m.) of 4-cyanothiazole and 16.9 g. (0.182 m.) of aniline in 80 ml. of o-dichlorobenzene. The o-dichlorobenzene contains some of the isomeric p-dichlorobenzene. At the end of 25 minutes all of the aniline is converted to aniline hydrochloride and the temperature rises from 25–45° C. Hydrogen chloride addition is stopped and the mixture stirred for 95 minutes during which time the temperature falls to 25° C.

The mixture is then heated to 140° C. over a period of 1 hour during which time gaseous hydrogen chloride is added at the rate of 0.6 meq./minute. The reaction mixture is held at 140–145° C. for 2½ hours with continued addition of hydrogen chloride. A total of about 40% excess of acid is added. At the end of this time N-phenyl-(thiazole-4-amidine)-hydrochloride is present as crystals in the reaction mixture. The mixture is cooled to 30° C. and 200 ml. of water added to dissolve the amidine hydrochloride. The resulting mixture is stirred vigorously while the pH is adjusted to 4.5 with 34% sodium hydroxide. The agitation is stopped and the layers allowed to separate. The upper aqueous layer is separated from the o-dichlorobenzene layer. It contains 41 g. of N-phenyl-(thiazole-4-amidine)hydrochloride by ultraviolet assay (94% yield).

*Example 6*

16.9 g. (0.182 m.) of aniline and 19.3 g. (0.187 m.) of benzonitrile are added to 90 ml. of o-dichlorobenzene at 25–30° C., and 6.65 g. (0.182 m.) of dry hydrogen chloride gas passed into the mixture over a period of about 30 minutes. The mixture is then heated to 140–145° C. over 30 minutes during which time 2.7 g. of dry hydrogen chloride is added. The reaction mixture is heated for 2.5 hours at 140–145° C., then cooled to 25–30° C. The solid, crystalline N-phenyl benzamidine hydrochloride is removed by filtration, and dried. On recrystallization from methanol-ether it has M.P. 231–232° C.

*Example 7*

10.5 g. (0.112 m.) of 3-aminopyridine and 12.3 g. (0.112 m.) of 4-cyanothiazole are added to 50 ml. of o-dichlorobenzene at about room temperature. To the resulting mixture there is charged 4.1 g. (0.112 m.) of dry hydrogen chloride in order to convert the 3-aminopyridine to its acid salt. The resulting mixture is heated to 135–140° C. and an additional 2.0 g. of dry hydrogen chloride added. The reaction is stirred at 135–140° C. for 3 hours during which time N-(3-pyridyl)thiazole-4-amidine hydrochloride crystallizes. The mixture is cooled to about 20° C. and the amidine recovered by filtration. Recrystallization from methanol-ether yields pure material, M.P. 223–225° C.

*Example 8*

When the procedure of example 2 is repeated using the nitriles set forth below in place of 2-cyanothiazole, the corresponding N-phenyl amidine hydrochlorides are produced.

| Nitrile reactant: | End product |
| --- | --- |
| 1,2,3-thiadiazole-4-nitrile | N - phenyl-(1,2,3-thiadiazole - 4 - amidine) - hydrochloride. |
| Thiophene-2-nitrile | N - phenyl-(thiophene-2 - amidine)-hydrochloride. |
| Thiophene-3-nitrile | N - phenyl-(thiophene-3 - amidine) - hydrochloride. |
| Pyridine-3-nitrile | N - phenyl-(pyridine-3 - amidine)-hydrochloride. |

The amidine hydrochlorides obtained according to the process of this invention have a variety of uses, but are particularly suitable as intermediates in preparing 2-substituted benzimidazoles and azabenzimidazoles, which substances are active anthelmintic agents. Thus, reaction of an amidine of Formula I above with sodium hypochlorite gives an N-chloro amidine, and treatment of this latter substance with potassium hydroxide in ethanol affords the benzimidazole:

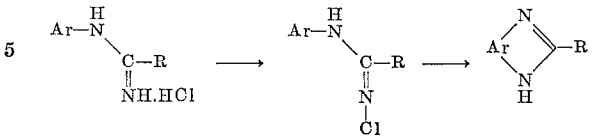

where Ar and R have the same meaning as described above. This process, though not a part of the present invention, is for the sake of completeness described below as applied to the conversion of N-phenyl-(thiazole-4- amidine)-hydrochloride to 2-(4'-thiazolyl)-benzimidazole, and, of N-(3-pyridyl)-thiazole-4-amidine hydrochloride to 2-(4'-thiazolyl)-4-azobenzimidazole.

35 ml. of diethyl ether is added to a stirred solution of 5.0 g. (20.8 millimoles) of N-phenyl-(thiazole-4-amidine)-hydrochloride in 46 ml. of water. The resulting mixture is cooled to between 0–10° C. and then 7.31 ml. of 2.85 N sodium hypochlorite (20.8 millimoles) is added thereto over a period of about 2 minutes. Stirring is contained for an additional 10 minutes. The solvent layers are allowed to separate and the ethereal layer is removed, washed with water and dried over calcium chloride. It is then filtered and concentrated to dryness in vacuo to give a dark solid material. This substance is recrystallized from ethanol-petroleum ether to give substantially pure N-chloro-N'-phenyl-(thiazole-4-amidine), M.P. 96–98° C.

To a stirred solution of 1.0 g. of N-chloro-N'-phenyl-(thiazole-4-amidine) in 25 ml. of ethanol there is added 278 mg. of potassium hydroxide (85% pure) in 10 ml. of ethanol. The resulting solution is refluxed for about 1 minute (or until a negative potassium iodide-starch test is obtained). Sufficient water is then added to dissolve the solid potassium chloride and the pH of the solution adjusted to 6 with hydrochloric acid. 2-(4'-thiazolyl)-benzimidazole crystallizes. The product is recovered by filtration and washed with a small amount of cold ethanol, M.P. 298–300° C.

To a stirred solution of 26.4 g. (0.110 mole) of N-(3-pyridyl)-thiazole-4-amidine hydrochloride in 200 ml. of water containing 200 ml. of methylene chloride there is added 38.5 ml. of 2.86 M of sodium hypochlorite (0.110 mole) at room temperature over eight minutes. After ten additional minutes of stirring, the organic layer is separated and the aqueous layer extracted with 3 x 20 ml. portions of methylene chloride. The combined methylene chloride extracts are dried over sodium sulfate, filtered, and concentrated to crystalline N-chloro-N'-(3-pyridyl)-thiazole-4-amidine hydrochloride, M.P. 93–96.5° C.

To a stirred suspension of 2.00 g. (8.38 mmoles) of N-chloro-N'-(3-pyridyl)-thiazole - 4 - amidine hydrochloride in 24 ml. of 50% aqueous methanol there is added 0.98 g. (9.22 mmoles) of sodium carbonate as a saturated aqueous solution. The mixture is refluxed until the positive halogen test on potassium iodide-starch paper is negative (20 min.) after which it is cooled to room temperature, filtered, and washed with cold 50% aqueous methanol, then with water, to yield 0.39 g. of 2-(4'-thiazolyl)-4-azabenzimidazole, M.P. 304–307° C.

The reactants employed in the process of our invention are generally known in the chemical arts. Those nitriles which have not been previously described may be obtained from the corresponding carboxylic acid compounds by the process set forth below for making 4-cyanothiazole.

60 g. of dry thiazole-4-carboxylic acid is added with stirring to 146 ml. of thionyl chloride. The reaction mixture is heated under gentle reflux for 2 hours. The excess thionyl chloride is then removed in vacuo, and 300 ml. of petroleum ether added slowly to the oily residue. The resulting mixture which contains precipitated thiazole-4-carboxylic acid chloride is cooled to 15° C., and the desired acid chloride removed by filtration. It is washed with cold petroleum ether and dried in vacuo, M.P. 85° C.

Approximately 14 g. of dry ammonia gas is added to a solution of 40 g. of thiazole-4-carboxylic acid chloride in 300 ml. of benzene over a period of 1 hour. The temperature is maintained at 30–35° C. The reaction mixture is then aged for 1 hour at 25° C. The solid product is removed by filtration and dried in vacuo. It is suspended in 130 ml. of cold water to dissolve ammonium chloride. The suspension is filtered and washed with cold water. The wet solid is then dissolved in 150 ml. of boiling water, the solution treated with decolorizing charcoal, filtered while hot and cooled to 5° C. The crystalline thiazole-4-carboxamide thus obtained is recovered by filtration and dried in vacuo at 40° C., M.P. 152–153° C.

24 g. of thiazole-4-carboxamide and 20 g. of phosphorus pentoxide are intimately mixed in a round bottomed flask fitted with a short condenser and a receiver. The mixture is heated in an oil bath at a bath temperature of 200–220° C. for 20 minutes. The mixture is then distilled, 4-cyanothiazole distilling at 100–120° C./20 mm. The product is purified by sublimation (65° C./30 mm.), M.P. 60–61° C.

Any departure from the above description which conforms to the present invention is intended to be included within the scope of the claims.

We claim:
1. In the method for making an N-substituted amidine by heating together under anhydrous conditions a primary aromatic amine hydrochloride and a nitrile of the formula R—CN, where R is a member of the class consisting of aryl, pyridyl, and five-membered heterocyclic rings containing at least 2 carbon atoms in the hetero ring, wherein the hetero atoms are selected from the group consisting of oxygen, sulfur, and nitrogen, the improvement that comprises conducting the reaction in a solvent medium comprising a polychlorinated benzene having a boiling point below 222° C.

2. In the method for making an N-substituted amidine by heating together under anhydrous conditions a primary aromatic amine hydrochloride and a nitrile of the formula R—CN, where R is a member of the class consisting of aryl, pyridyl, and five-membered heterocyclic rings containing at least 2 carbon atoms in the hetero ring, wherein the hetero atoms are selected from the group consisting of oxygen, sulfur, and nitrogen, the improvement that comprises conducting the reaction in a solvent medium comprising a polychlorinated benzene having a boiling point below 222° C., and in the presence of excess hydrogen chloride.

3. In the method for making an N-substituted amidine by heating together under anhydrous conditions a primary aromatic amine hydrochloride and a nitrile of the formula R—CN, where R is a member of the class consisting of aryl, pyridyl, and five-membered heterocyclic rings containing at least 2 carbon atoms in the hetero ring, wherein the hetero atoms are selected from the group consisting of oxygen, sulfur, and nitrogen, the improvement that comprises conducting the reaction in a solvent medium comprising o-dichlorobenzene.

4. In the method for making an N-substituted amidine by heating together under anhydrous conditions a primary aromatic amine hydrochloride and a nitrile of the formula R—CN, where R is a member of the class consisting of aryl, pyridyl, and five-membered heterocyclic rings containing at least 2 carbon atoms in the hetero ring, wherein the hetero atoms are selected from the group consisting of oxygen, sulfur, and nitrogen, the improvement that comprises conducting the reaction in a solvent medium comprising o-dichlorobenzene, and in the presence of excess hydrogen chloride.

5. In the method for preparing N-phenyl thiazoleamidine hydrochloride by heating together under anhydrous conditions cyanothiazole and aniline hydrochloride, the improvement that comprises conducting the reaction in a solvent medium comprising a polychlorinated benzene having a boiling point below 222° C. and in the presence of excess hydrogen chloride.

6. In the method for preparing N-phenyl thiazole-4-amidine hydrochloride by heating together under anhydrous conditions 4-cyanothiazole and aniline hydrochloride, the improvement that comprises conducting the reaction in a solvent medium comprising o-dichlorobenzene and in the presence of excess hydrogen chloride.

7. In the method for preparing N-phenyl thiazole-2-amidine hydrochloride by heating together under anhydrous conditions 2-cyanothiazole and aniline hydrochloride, the improvement that comprises conducting the reaction in a solvent medium comprising o-dichlorobenzene and in the presence of excess hydrogen chloride.

8. In the process for preparing N-phenyl benzamidine hydrochloride by heating together under anhydrous conditions aniline hydrochloride and benzonitrile, the improvement that comprises conducting the reaction in a solvent medium comprising o-dichlorobenzene and in the presence of excess hydrogen chloride.

9. In the method for making an N-substituted amidine by heating together under anhydrous conditions a primary aromatic amine hydrochloride and a nitrile of the formula R—CN, where R is a five-membered heterocyclic ring containing at least 2 carbon atoms in the hetero ring and wherein the hetero atoms are selected from the group consisting of oxygen, sulfur, and nitrogen, the improvement that comprises conducting the reaction in a solvent medium comprising a polychlorinated benzene having a boiling point below 222° C., and in the presence of excess hydrogen chloride.

References Cited by the Examiner
FOREIGN PATENTS
135,359 11/1946 Australia.
558,322 6/1958 Canada.

OTHER REFERENCES
Houben-Weyl: Methoden Der Organishen Chemie, vol. 11/2 (Stuttgart, 1958), pp. 38–41.
Shriner et al.: Chem. Rev., vol. 33, page 363 (1944).

ALEX MAZEL, *Primary Examiner.*
A. D. ROLLINS, *Assistant Examiner.*